Figure 1:
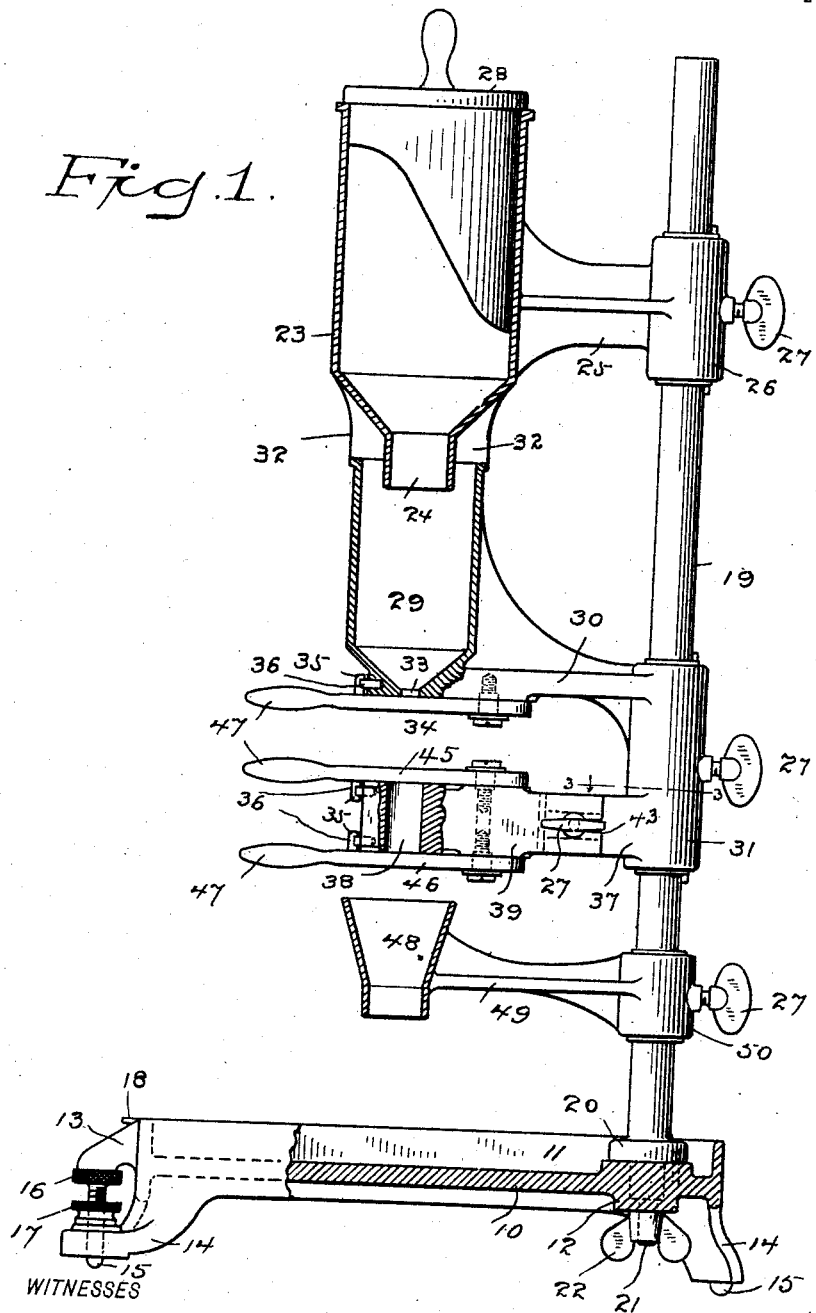

No. 866,747. PATENTED SEPT. 24, 1907.
W. M. THOMAS & W. H. LEACH, Jr.
MEASURING MACHINE.
APPLICATION FILED APR. 22, 1907.

2 SHEETS—SHEET 1.

WITNESSES
H. A. Lamb.
S. W. Atherton.

INVENTORS
William M. Thomas
William H. Leach, Jr.
BY
A. W. Wooster
ATTORNEY

No. 866,747. PATENTED SEPT. 24, 1907.
W. M. THOMAS & W. H. LEACH, Jr.
MEASURING MACHINE.
APPLICATION FILED APR. 22, 1907.
2 SHEETS—SHEET 2.
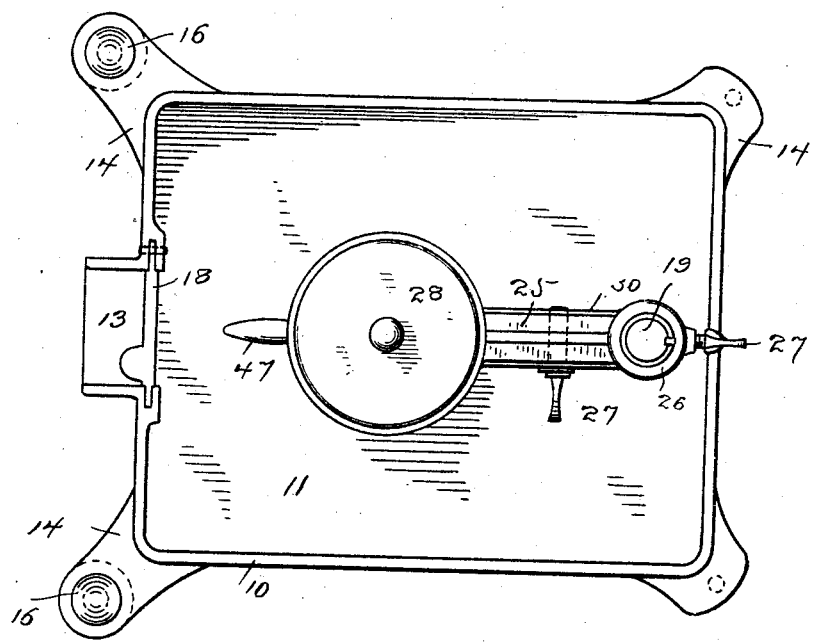
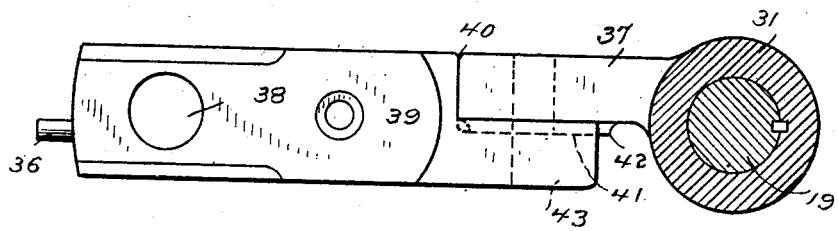
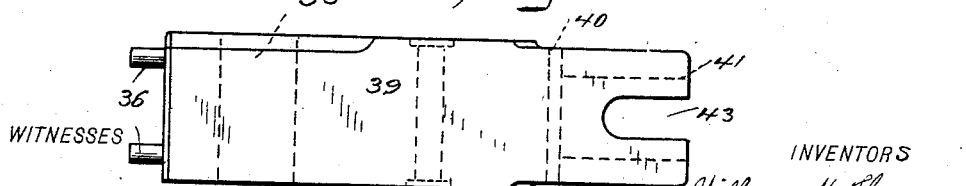
WITNESSES
H. A. Lamb.
S. W. Atherton.
INVENTORS
William M. Thomas
William H. Leach, Jr.
BY
A. M. Wooster
ATTORNEY

UNITED STATES PATENT OFFICE.

WILLIAM M. THOMAS AND WILLIAM H. LEACH, JR., OF BRIDGEPORT, CONNECTICUT, ASSIGNORS TO THE UNION METALLIC CARTRIDGE COMPANY, OF BRIDGEPORT, CONNECTICUT A CORPORATION OF CONNECTICUT.

MEASURING-MACHINE.

No. 866,747.      Specification of Letters Patent.      Patented Sept. 24, 1907.

Application filed April 22, 1907. Serial No. 369,473.

*To all whom it may concern:*

Be it known that we, WILLIAM M. THOMAS and WILLIAM H. LEACH, Jr., citizens of the United States, residing at Bridgeport, county of Fairfield, State of Connecticut, have invented a new and useful Measuring-Machine, of which the following is a specification.

This invention has for its object to provide a measuring machine adapted for general use and especially adapted to provide a bulk powder measure for standardizing the bulk of smokeless powders for use in loading shot cartridges.

Special uses of the machine are to check up bulk smokeless powders as received in drums so as to insure that each drum will furnish a certain number of charges of uniform density and to check up loading machines so as to insure that the charger bushings will just contain a predetermined bulk of powder as measured by the machine. An important use of the machine therefore is to provide means for measuring the powder in such a manner as to insure uniform density of a predetermined bulk and therefore to insure that uniform quantities of powder measured by the machine will always have a uniform weight.

With these and other objects in view we have devised the novel measuring machine, of which the following description in connection with the accompanying drawings is a specification, reference characters being used to indicate the several parts.

Figure 1 is an elevation of our novel measuring machine partly in vertical section to illustrate the construction thereof; Fig. 2 a plan view corresponding with Fig. 1; Fig. 3 a horizontal section on an enlarged scale on the line 3—3 in Fig. 1, looking in the direction of the arrow, the measure appearing in plan; and Fig. 4 is a side elevation of the measure block detached.

10 denotes the base of the machine which is cast in a single piece and comprises a pan 11, a hub 12, a chute 13 and legs 14. We have shown the rear legs as provided with bearing bosses 15 and the front legs as provided with leveling screws 16 which are provided with check nuts 17 to lock the screws in position after adjustment. The chute is closed by a hinged vertically swinging gate 18.

19 denotes the standard which is provided with a flange 20 which rests upon the hub and a reduced portion of which engages the hub and is provided with a threaded end 21 which passes through the hub and receives a wing nut 22 by which the standard is rigidly secured to the base.

23 denotes the upper reservoir which is provided at its lower end with a discharge nozzle 24. This reservoir is carried by an arm 25 having a sleeve 26 which engages the standard with a spline and groove connection so as to hold it against rotation on the standard but permit it to be moved longitudinally thereon or removed and replaced, the reservoir being locked in place on the standard by a set screw 27. The upper reservoir is closed by a scoop cover indicated by 28.

29 denotes the lower reservoir which is carried by an arm 30 extending from a sleeve 31 which engages the standard with a slot and groove connection so as to hold it against rotation thereon but permit it to be moved longitudinally thereon or removed and replaced, the sleeve being locked in place on the standard by a set screw 27. The lower end of the upper reservoir is provided with spacing ribs 32 which in use rest upon the lower reservoir. At the lower end of the lower reservoir is a discharge opening indicated by 33.

34 denotes a gate pivoted to the lower side of arm 30 and acting to close discharge opening 33. The gate is provided with a pin 35 which engages a stop pin 36 in the arm to limit the movement of the gate in shutting off the flow of powder from the lower reservoir. 37 denotes another arm extending from sleeve 31 which carries a detachable measure 38. This measure is formed in a block 39 which is provided with a vertical recess 40 which receives the arm, with a groove 41 which receives a rib 42 on the arm and with a slot 43 through which a set screw 27 passes by which the block containing the measure is secured to the arm. In practice, the block is set up closely against the end of the arm, the rib and groove preventing vertical movement, and the block is locked in place by tightening the set screw against the outer face of the block.

45 denotes an upper gate which is pivoted to the upper side of block 39 to level off the powder on the top of the measure, and 46 a lower gate pivoted to the under side of the block which closes the bottom of the measure. Both gates are provided with pins 35 which engage stop pins 36 in the block to limit the closing movement of the gates. Gates 34, 45 and 46 are shown as provided with hand pieces 47 for convenience in manipulation. 48 denotes a funnel below the measure which is carried by an arm 49 having a sleeve 50 engaging the standard and secured in place by a set screw 27. This funnel is simply for convenience in controlling the flow of powder from a measure into the scoop cover or into a scale pan, as may be, for weighing.

The operation is as follows: Having secured the parts in place as described and as illustrated in the drawings, the ribs upon the upper reservoir resting upon the top of the lower reservoir, the cover is removed and both reservoirs are filled with powder, the gate under the upper reservoir being of course closed and care being taken to see that the powder passes freely through nozzle 24 and that the discharge opening in the lower reservoir is filled. The scoop cover is then placed under the funnel and the gates are opened to permit the passage of powder. When the powder flows freely, gates 34 and 46 are closed and the powder in the scoop cover may be returned to the upper reservoir. Lever 34 is then opened and the powder allowed to fill the measure until it overflows slightly. Gate 34 is then closed to shut off the flow of powder and gate 45 is closed to level the measure and brush off surplus powder which falls down into the pan. The measure will then contain the predetermined bulk of powder; for example, three drams. Lever 46 is then opened and the measured powder allowed to pass through the funnel and into the scoop cover or into a scale pan so that the weight may be taken. Care should be taken that the powder in the upper reservoir is never entirely exhausted, so that the lower reservoir will always be filled with powder and the passage of powder from the measure will always be under uniform conditions, thus insuring that the powder as measured by the machine will always be of uniform density. The powder dropping into the pan is brushed out through the chute into the scoop cover and returned to the upper reservoir, thus avoiding any waste.

Having thus described our invention we claim:

1. In a machine of the character described, the combination with a lower reservoir having a discharge opening, a pivoted horizontally swinging gate below said opening and an upper reservoir having a nozzle extending into the lower reservoir, for the purpose set forth, of a measure at a fixed distance below the discharge opening and horizontally swinging gates above and below the measure.

2. In a machine of the character described, the combination with a lower reservoir having a discharge opening, a pivoted horizontally swinging gate below said opening and an upper reservoir having a nozzle extending into the lower reservoir, of a measure at a fixed distance below the discharge opening, horizontally swinging gates above and below the measure, a funnel under the measure, a base and a standard extending therefrom by which the parts are carried.

3. In a machine of the character described, the combination with a lower reservoir having a discharge opening, an upper reservoir having a nozzle extending into the lower reservoir and spacing ribs adapted to engage the lower reservoir, of a measure at a fixed distance below the lower reservoir and gates below the lower reservoir and above and below the measure, substantially as described, for the purpose specified.

4. In a machine of the character described, the combination with upper and lower reservoirs, the former having a nozzle extending into the latter, of a measure at a fixed distance below the lower reservoir, a gate for cutting off the flow from the lower reservoir, a gate for closing the measure and a gate for leveling off the top of the measure.

5. In a machine of the character described the combination with a base having a pan, a chute extending therefrom and a gate closing the chute, of a standard extending from the base, upper and lower reservoirs carried by the standard, the upper reservoir having a nozzle extending into the lower reservoir, a measure at a fixed distance from the lower reservoir and gates below the lower reservoir and above and below the measure.

6. In a machine of the character described, the combination with a base having a pan and legs provided with leveling screws and a standard extending from the base, of upper and lower reservoirs, and a measure below the lower reservoir, all secured to the standard, a gate below the lower reservoir, gates above and below the measure and a funnel between the measure and the pan.

7. In a machine of the character described, the combination with a base, a standard extending therefrom, sleeves 26 and 31 secured to the standard, an upper reservoir provided with a nozzle and spacing ribs, an arm extending from sleeve 26 by which said reservoir is carried, a lower reservoir into which the nozzle extends, a measure below the lower reservoir, arms extending from sleeve 31 by which the lower reservoir and the measure are carried, and gates below the lower reservoir and the measure.

8. In a machine of the character described, the combination with a standard having sleeves 26 and 31 detachably secured thereto, means for holding said sleeves against rotation, a lower reservoir, a measure below the lower reservoir, arms extending from sleeve 31 by which said reservoir and measure are carried, gates for closing said reservoir and measure, an upper reservoir having spacing ribs to engage the top of the lower reservoir and a nozzle extending into said lower reservoir and an arm extending from sleeve 26 by which the upper reservoir is carried.

9. In a machine of the character described, the combination with a standard and a sleeve secured thereto and having arms extending therefrom, of a reservoir secured to one of said arms and having a discharge opening and a gate for closing said opening, a block detachably secured to the other arm and provided with a measure lying below the discharge opening, and a gate for closing the bottom of the measure.

10. In a machine of the character described, the combination with a standard and a sleeve secured thereto and having arms extending therefrom, of a reservoir secured to one of said arms and having a discharge opening and a gate for closing said opening, a block detachably secured to the other arm and provided with a measure lying below the discharge opening, a gate for closing the bottom of the measure, a gate for leveling off the top of the measure and means for stopping the movement of the gates at the closing position.

11. In a machine of the character described, the combination with a standard and a sleeve secured thereto and having arms 30 and 37 extending therefrom, of a reservoir secured to arm 30 and provided with a discharge opening and a gate for closing said opening, a block detachably secured to arm 37 and provided with a measure and gates above and below said measure.

12. In a machine of the character described, the combination with a standard and a sleeve secured thereto and having an arm 37 extending therefrom and provided with a rib, of a block provided with a measure, a recess to receive the arm, a groove to receive the rib and a slot, a set-screw passing through said slot and engaging the arm and pivoted gates for closing and for leveling off the measure.

In testimony whereof we affix our signatures in presence of two witnesses.

WILLIAM M. THOMAS.
WILLIAM H. LEACH, JR.

Witnesses:
GEORGE A. KUHL,
LENORE V. BURNS.